United States Patent [19]

Ishikuro et al.

[11] Patent Number: 4,600,638
[45] Date of Patent: Jul. 15, 1986

[54] MAGNETIC RECORDING MEDIUM

[75] Inventors: Tadashi Ishikuro; Ryuji Shirahata; Takahito Miyoshi; Masaaki Fujiyama, all of Kanagawa, Japan

[73] Assignee: Fuji Photo Film Co., Ltd., Kanagawa, Japan

[21] Appl. No.: 610,230

[22] Filed: May 15, 1984

[30] Foreign Application Priority Data

May 16, 1983 [JP] Japan ................................ 58-84075

[51] Int. Cl.$^4$ ................................ G11B 5/72
[52] U.S. Cl. .................... 428/323; 360/134; 360/135; 360/136; 427/128; 427/131; 428/328; 428/330; 428/331; 428/408; 428/694; 428/695; 428/900
[58] Field of Search ............... 428/403, 407, 694, 695, 428/408, 323, 328, 331, 336, 330, 900; 427/44, 130, 131; 360/134–136

[56] References Cited

U.S. PATENT DOCUMENTS

| | | | |
|---|---|---|---|
| 4,310,599 | 1/1982 | Akashi | 428/413 |
| 4,328,935 | 5/1982 | Steel | 428/900 |
| 4,367,261 | 1/1983 | Miyoshi | 428/336 |
| 4,414,270 | 11/1983 | Miyoshi | 428/325 |
| 4,419,406 | 12/1983 | Isobe | 428/422 |
| 4,442,171 | 4/1984 | Sato | 428/336 |
| 4,544,601 | 10/1985 | Yamaguchi | 427/131 |
| 4,551,386 | 11/1985 | Yamaguchi | 427/131 |
| 4,552,807 | 11/1985 | Yamada | 428/695 |

*Primary Examiner*—Ellis P. Robinson
*Attorney, Agent, or Firm*—Sughrue, Mion, Zinn, Macpeak, and Seas

[57] ABSTRACT

A magnetic recording medium is disclosed, which comprises a non-magnetic support having, on opposite surfaces thereof, a magnetic recording layer containing magnetic particles and a backing layer containing carbon black and other inorganic particles and a binder having a thickness of not more than 2μ, the backing layer containing (a) carbon black having an average particle size of 60 to 120 mμ and (b) other inorganic particles having an average particle size of 20 to 100 mμ.

16 Claims, No Drawings

MAGNETIC RECORDING MEDIUM

FIELD OF THE INVENTION

The present invention relates to a magnetic recording medium, and more particularly to a magnetic recording medium having a decreased abrasion coefficient unaccompanied by a decrease in electromagnetic properties, an improved running durability and a backing layer of the tape which is not scraped away.

BACKGROUND OF THE INVENTION

Generally, magnetic recording tapes are used as audio tapes, video tapes and computer tapes. Due to the recent increased demand for high density recording, a ferromagnetic thin metal film type magnetic recording medium which is prepared by a vapor deposition method such as vacuum evaporation, sputtering or ion plating or plating such as electric plating or electroless plating as described in U.S. Pat. Nos. 4,002,546, 4,226,681, 4,354,908, etc., has drawn attention and has been put into practical use. The surface of the magnetic recording layer for magnetic recording tapes for audio, video or computer use is smoothed to improve sensitivity (i.e., particularly output in the high frequency region). However, a magnetic recording tape with a smooth surface tends to be wound unevenly upon winding and rewinding. Where such a tape is used, the running properties are decreased because of changes of tension and thus the output changes. Further, the tape tends to be deformed and to be damaged. A magnetic recording tape having a backing layer which is provided on the surface of a support opposite to the surface on which the magnetic recording layer is present has been proposed to eliminate the above defects as described in U.S. Pat. No. 4,367,261.

However, defects such as scraping away, increase in abrasion coefficient and tape damage with the conventionally used backing layer, and further improvement is desired.

Further, where a backing layer is provided to improve the running properties and running durability, it is known that the magnetic recording medium (particularly, in the form of a tape) has defects that where the magnetic recording medium is wound in a roll or is piled as sheets, the unevenness of the backing layer is transferred to the surface of the magnetic recording layer, the surface properties of the magnetic recording layer are deteroprated and the electromagnetic properties, particularly S/N characteristic of the magnetic recording medium, are degraded.

There are serious defects in a metal thin film type magnetic recording medium, for example, (1) abrasion resistance toward the magnetic head or guide pole upon recording, reproducing and erasing signals is high, and therefore wear resistance decreases and (2) the abrasion coefficient toward tape guiding systems for magnetic tapes to run is large because a smooth support is used for high density and high S/N recording, and therefore the running is unstable. Specifically, a high degree of jitter occurs while the tape is running.

SUMMARY OF THE INVENTION

An object of the present invention is to provide a magnetic recording medium having excellent running durability without an increase in the abrasion coefficient.

Another object of the present invention is to provide a magnetic recording medium having a backing layer which is suitable for general coated type magnetic recording tapes and metal thin film type magnetic tapes without deteriorating the S/N characteristics of the magnetic recording medium.

The objects of the present invention are attained by a magnetic recording medium comprising a non-magnetic support having on opposite surfaces a magnetic recording layer and a backing layer containing carbon black and other inorganic particles and a binder in a thickness of not more than $2\mu$, the backing layer containing (a) carbon black having an average particle size of 60 to 120 m$\mu$ and (b) other inorganic particles having an average particle size of 20 to 100 m$\mu$. The weight ratio of (a) carbon black and (b) other inorganic particles is preferably 0.5/99.5 to 40/60.

DETAILED DESCRIPTION OF THE INVENTION

The particle sizes of carbon black and of inorganic particles are determined according to ASTM D-3849-79, D-3037-76 and D-1511-79.

The average particle size of carbon black used in this invention is 60 m$\mu$ to 120 m$\mu$ and preferably 80 m$\mu$ to 120 m$\mu$.

Typical examples of (a) carbon black which can be in this invention include "Asahi Thermal" and "Asahi #60" commercially available from Asahi Carbon Co., Ltd. and "Dia Black G" commercially available for Mitsubishi Chemical Industry Co., Ltd.

The particle size of (b) the inorganic particles used in this invention is 20 m$\mu$ to 100 m$\mu$, preferably 30 m$\mu$ to 80 m$\mu$ and more preferably 60 m$\mu$ to 80 m$\mu$.

The weight ratio of (a) carbon black to (b) inorganic particles is 0.5/99.5 to 40/60, preferably 0.5/99.5 to 30/70 and more preferably 0.5/99.5 to 20/80. Inorganic particles which can be used in this invention include graphite, $SiO_2$, $CaCO_3$, $Al_2O_3$, $Fe_2O_3$, $TiO_2$, MnO, ZnO, and CaC. Of these, $CaCO_3$, $TiO_2$ and $SiO_2$ are preferred and $CaCO_3$ is the most preferred.

Suitable binders for the backing layer include conventionally known binders such as a thermoplastic resin, a thermosetting resin, a reactive type resin or a mixture thereof as described in U.S. Pat. No. 4,135,016. Binders can be selected from those described below and those which are a mixture of at least two kinds and have a glass transition temperature Tg of not lower than 40° C. are preferred and those having a Tg of not lower than 60° C. are more preferred.

Suitable thermoplastic resins which can be used include a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of an acrylate and styrene, a copolymer of a methacrylate and acrylonitrile, a copolymer of a methacrylate and vinylidene chloride, a copolymer of a methacrylate and styrene, a urethane elastomer, polyvinyl fluoride, a copolymer of vinylidene chloride and acrylonitrile, a copolymer of butadiene and acrylonitrile, a polyamide resin, polyvinyl butyral, a cellulose resin (e.g., cellulose acetate butyrate, cellulose diacetate, cellulose propionate, nitrocellulose and the like), a copolymer of styrene and butadiene, a polyester resin, a copolymer of chlorovinyl ether and acrylate, an amino resin, and various rubber type resins. Of these, a cellulose resin, a urethane elastomer and a polyester resin are preferred.

Suitable thermosetting resins or reactive type resins which can be used include a phenol resin, an epoxy resin, a curable polyurethane resin, an urea resin, a melamine resin, an alkyd resin, an acryl reactive resin, a polyisocyanate and polyamide. Of these, a curable polyurethane resin and a polyisocyanate are preferred.

The weight ratio of the total of (a) the carbon black plus (b) the inorganic particles to the binder used for the backing layer in this invention is preferably 2.5/1 to 0.1/1 and more preferably 1.5/1 to 0.8/1. The thickness of the backing layer in this invention is preferably not more than $2\mu$ and more preferably 0.3 to $1.5\mu$ and most preferably 0.5 to $1.0\mu$.

Suitable high molecular weight supports which can be used in this invention include an acid cellulose; cellulose nitrates; ethylcellulose; methyl cellulose; polyamide; polymethyl methacrylate; polytetrafluoroethylene; polytrifluoroethylene; a polymer or a copolymer of an olefin such as ethylene or propylene; a polymer or a copolymer of vinyl chloride; polyvinylidene chloride; polycarbonate; polyimide; polyesters such as polyethylene terephthalate as described in U.S. Pat. No. 4,135,016. Of these, polyimide and polyethylene terephthalate are preferred.

The invention is further explained by reference to the following Examples. Part in Examples means part by weight.

EXAMPLE 1

A magnetic recording layer containing Co-containing iron oxide and a backing layer was provided on opposite surfaces. A polyethylene terephthalate support having a thickness of $14\mu$ of the backing layer, having the following composition, was coated to have a dry thickness of $1\mu$, with the particle sizes of the carbon black and inorganic particles being varied.

| | |
|---|---|
| Nitrocellulose | 25 parts |
| Polyurethane ("Nipporan 2301" manufactured by Nihon Polyurethane Co., Ltd.) | 15 parts |
| Polyisocyanate ("Coronate L" manufactured by Nihon Polyurethane Co., Ltd.) | 40 parts |
| Methyl Ethyl Ketone | 480 parts |
| (a) Carbon Black + (b) CaCO3 Particles (Mixing ratios as shown in Table 1 below) | 100 parts |

The thus obtained samples were designated Sample Nos. 1 to 10.

EXAMPLE 2

A Co-Ni (Ni 20 wt%) magnetic recording layer which was formed by oblique vapor deposition (thickness $0.15\mu$) and a backing layer were provided on opposite surfaces. A polyethylene terephthalate support having a thickness of $12\mu$ of the backing layer had the same composition as in Example 1 and was coated to have a dry thickness of $1\mu$. The thus prepared samples were designated Sample Nos. 11 and 12.

Each of the samples of the above described magnetic tapes were tested and the results obtained are shown in Table 1 below..

Test Method 1:

The tape was placed on VHS type VTR and the change in the output of the tape which had not been used (virgin tape) and had been used for 100 passes was evaluated.

Test Method 2:

The abrasion coefficient was evaluated on a magnetic recording layer and a backing layer by measuring the kinetic abrasion coefficient $T_2/T_1$ with respect to a stainless steel pole, for a virgin tape and after the tape was used for 100 passes.

Test Method 3:

The surface of the backing layer was evaluated to determine whether any scraped away areas were observed after the tape placed on a VHS type VTR had been run for 100 passes.

TABLE

| Sample No. | Particle Diameter of carbon Black (m$\mu$) | Particle Diameter of CaCO3 Particles (m$\mu$) | Weight Ratio of Carbon Black and CaCO3 Particles | Deterioration of Electromagnetic Properties after 100 Passes | Virgin Tape Magnetic Layer | Virgin Tape Backing Layer | After 100 passes Magnetic Layer | After 100 passes Backing Layer | Scraping away |
|---|---|---|---|---|---|---|---|---|---|
| 1 | 100 | 50 | 0.1/99.9 | 0.3 | 2.9 | 2.5 | 2.5 | 3.2 | Very Slight |
| 2 | 100 | 50 | 0.5/99.5 | 0.1 | 2.9 | 2.0 | 2.6 | 3.2 | None |
| 3 | 100 | 50 | 10/90 | 0.1 | 2.6 | 1.7 | 2.6 | 1.8 | None |
| 4 | 100 | 50 | 30/70 | 0.3 | 2.6 | 1.7 | 2.5 | 1.8 | Very Slight |
| 5 | 100 | 50 | 50/50 | 1.2 | 2.6 | 1.7 | 2.5 | 1.8 | Slight |
| 6 | 100 | 50 | 60/40 | 1.5 | 2.6 | 1.7 | 2.5 | 1.8 | Slight |
| 7 | 20 | 50 | 10/90 | 0.4 | 2.9 | 2.7 | 2.6 | 3.7 | Slight |
| 8 | 280 | 50 | 10/90 | 1.4 | 2.9 | 1.6 | 2.9 | 1.9 | Slight |
| 9 | 100 | 200 | 10/70 | 1.2 | 2.6 | 1.7 | 2.6 | 1.8 | Much |
| 10 | 100 | 300 | 10/90 | 1.3 | 2.6 | 1.7 | 2.6 | 1.8 | Much |
| 11 | 100 | 50 | 0.5/99.5 | 0.1 | 2.6 | 2.0 | 2.0 | 2.3 | None |
| 12 | 100 | 50 | 20/80 | 0.2 | 2.6 | 1.7 | 2.6 | 1.8 | None |

It is apparent from the results in Table 1 above that a magnetic recording tape having excellent electromagnetic properties, low abrasion coefficient and a backing layer which is not readily scraped away can be obtained with a thin backing layer containing carbon black and other inorganic particles in combination.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a nonmagnetic support having, on opposite surfaces thereof, a magnetic recording layer containing magnetic particles and a backing layer containing carbon black and other inorganic particles and a binder having a thickness of not more than $2\mu$, the backing layer containing (a) carbon black having an average particle size of 60 to 120 mμ and (b) other inorganic particles having an average particle size of 20 to 100 mμ and wherein the weight ratio of (a) carbon black to (b) the other inorganic particles is 0.5/99.5 to 40/60.

2. The magnetic recording medium of claim 1, wherein the binder of the backing layer is a mixture of binders having a glass transition temperature of Tg of not lower than 60° C.

3. The magnetic recording medium as claimed in claim 1, wherein the average particle size of carbon black is 80 mμ to 120 mμ.

4. The magnetic recording medium of claim 1, wherein the average particle size of the other inorganic particles (b) is 30 mμ to 80 mμ.

5. The magnetic recording medium as claimed in claim 3, wherein the average particle size of the other inorganic particles (b) is 60 mμ to 80 mμ.

6. The magnetic recording medium of claim 1, wherein said other inorganic particles (b) is selected from the group consisting of particles of graphite, $SiO_2$, $CaCO_3$, $Al_2O_3$, $Fe_2O_3$, $TiO_2$, MnO, ZnO and CaC.

7. The magnetic recording medium of claim 5, wherein said other inorganic particles (b) are particles of $CaCO_3$, $TiO_2$ or $SiO_2$.

8. The magnetic recording medium of claim 1, wherein the binder of the backing layer is a mixture of binders having a glass transition temperature of Tg of not lower than 40° C.

9. The magnetic recording medium of claim 1, wherein the weight ratio of the total of (a) the carbon black plus (b) the other inorganic particles to the binder in the backing layer is 2.5/1 to 0.1/1.

10. The magnetic recording medium of claim 1, wherein the thickness of the backing layer is 0.3μ to 1.5μ.

11. The magnetic recording medium of claim 10, wherein the thickness of the backing layer is 0.5μ to 1.0μ.

12. The magnetic recording medium of claim 1, wherein the weight ratio of (a) carbon black to (b) the other inorganic particles is 0.5/99.5 to 30/70.

13. The magnetic recording medium of claim 1, wherein the weight ratio of (a) carbon black to (b) the other inorganic particles is 0.5/99.5 to 20/80.

14. The magnetic recording medium of claim 1, wherein the weight ratio of the total of (a) the carbon black plus (b) the other inorganic particles to the binder in the backing layer is 1.5/1 to 0.8/1.

15. The magnetic recording medium of claim 1, wherein the other inorganic particles are $CaCO_3$ particles.

16. The magnetic recording medium of claim 1, wherein the weight ratio of (a) carbon black to (b) the other inorganic particles is 0.05/99.5 to 20/80, the average particle size of the other inorganic particles (b) is 60 mμ to 80 mμ, the weight ratio of the total of (a) the carbon black plus (b) the other inorganic particles to the binder in the backing layer is 1.5/1 to 0.8/1 and the (b) other inorganic particles are $CaCO_3$.

* * * * *